(12) United States Patent
Hoelzer et al.

(10) Patent No.: US 9,842,514 B2
(45) Date of Patent: Dec. 12, 2017

(54) DYNAMIC DEOXYRIBONUCLEIC ACID (DNA) MODELS AND KITS

(71) Applicant: MILWAUKEE SCHOOL OF ENGINEERING, Milwaukee, WI (US)

(72) Inventors: Mark A. Hoelzer, Milwaukee, WI (US); Timothy M. Herman, Wauwatosa, WI (US); Douglas L. Cook, Milwaukee, WI (US); Vito R. Gervasi, Brookfield, WI (US); Heather N. Ryan, Wauwatosa, WI (US); Diane L. Herman, Wauwatosa, WI (US)

(73) Assignee: MILWAUKEE SCHOOL OF ENGINEERING, Milwaukee, WI (US)

( * ) Notice: Subject to any disclaimer, the term of this patent is extended or adjusted under 35 U.S.C. 154(b) by 189 days.

(21) Appl. No.: 14/626,795

(22) Filed: Feb. 19, 2015

(65) Prior Publication Data
US 2015/0235568 A1     Aug. 20, 2015

Related U.S. Application Data

(60) Provisional application No. 61/941,985, filed on Feb. 19, 2014.

(51) Int. Cl.
G09B 23/26       (2006.01)

(52) U.S. Cl.
CPC .................... G09B 23/26 (2013.01)

(58) Field of Classification Search
USPC ........ 434/276, 277, 278, 279, 281; 446/102, 446/104, 120, 122, 124
See application file for complete search history.

(56) References Cited

U.S. PATENT DOCUMENTS

| | | | | |
|---|---|---|---|---|
| 133,620 A | * | 12/1872 | Benedict | ........... A61F 2/32 403/122 |
| 2,308,402 A | * | 1/1943 | Taylor | ........... G09B 23/26 434/278 |

(Continued)

OTHER PUBLICATIONS

Static 3-D "ball-and-stick" DNA models Dynamic "representative" models, using foam, plaster, etc.

(Continued)

*Primary Examiner* — Kurt Fernstrom
(74) *Attorney, Agent, or Firm* — Michael Best & Friedrich LLP

(57) ABSTRACT

A dynamic DNA model and DNA model kit that is based on the atomic coordinates of double-stranded DNA, but can be easily untwisted to form a flattened 2-D ladder structure. Once untwisted, the two strands of DNA can be easily "unzipped" to create single-stranded DNA templates that can be used to demonstrate the processes of DNA replication and transcription. The model and kit include two joints that allow the DNA model to be dynamically transformed from its helical arrangement into a straight ladder-like arrangement, with parallel base pairs and anti-parallel "backbones." One joint is a pin joint, having rotation about one axis, and translation along that axis. The second joint can be a "compound" joint having multiple degrees of freedom at different points; or, it can be simplified to a single rotation axis with a separate translation axis.

6 Claims, 14 Drawing Sheets
(11 of 14 Drawing Sheet(s) Filed in Color)

(56) References Cited

U.S. PATENT DOCUMENTS

| | | | | |
|---|---|---|---|---|
| 2,882,617 A * | 4/1959 | Godfrey | G09B 23/26 | 434/278 |
| 2,920,400 A * | 1/1960 | Subluskey | G09B 23/26 | 434/278 |
| 2,942,356 A * | 6/1960 | Weintraub | G09B 23/26 | 434/278 |
| 3,284,926 A * | 11/1966 | Godfrey | G09B 23/26 | 434/278 |
| 3,296,714 A * | 1/1967 | Klotz | G09B 23/26 | 434/279 |
| 3,458,949 A * | 8/1969 | Young | A63H 33/108 | 434/278 |
| 3,524,267 A * | 8/1970 | Barrett | G09B 23/26 | 434/278 |
| 3,648,404 A * | 3/1972 | Ogsbury | A63H 33/102 | 403/176 |
| 3,841,001 A * | 10/1974 | Nicholson | G09B 23/26 | 434/278 |
| 4,078,328 A * | 3/1978 | Rayment | A63H 33/108 | 446/102 |
| 4,184,271 A * | 1/1980 | Barnett, Jr. | G09B 23/26 | 434/279 |
| 4,325,698 A * | 4/1982 | Darling | G09B 23/26 | 403/207 |
| 4,348,190 A * | 9/1982 | Barrett | G09B 23/26 | 434/278 |
| 4,702,702 A * | 10/1987 | Mikelsaar | G09B 23/26 | 434/278 |
| 4,877,406 A * | 10/1989 | Wilk | G09B 23/26 | 273/153 S |
| 4,906,122 A * | 3/1990 | Barrett | G09B 23/26 | 403/290 |
| 5,030,103 A * | 7/1991 | Buist | G09B 23/26 | 434/278 |
| 5,947,745 A * | 9/1999 | Tempelman | G09B 23/20 | 434/278 |
| 6,036,497 A * | 3/2000 | Langmuir | G09B 23/26 | 434/279 |
| 6,264,522 B1 * | 7/2001 | Dickson | A44C 13/00 | 446/102 |
| 7,354,330 B2 * | 4/2008 | Bentley, Jr. | A44C 13/00 | 446/102 |
| 7,955,155 B2 * | 6/2011 | Tremblay | A63H 33/046 | 446/85 |
| 8,408,962 B2 * | 4/2013 | Sambenedetto | A63H 33/107 | 446/102 |
| 9,283,491 B2 * | 3/2016 | Pope-Gusev | A63H 33/008 | |

OTHER PUBLICATIONS

Carolina, "Science Supplies & Curriculum—STEM-Chemistry" website (2017) 3 pages, http://www.carolina.com/.

Ward's Science, "Welcome to Ward's Science, Introducing Ward's Pure Preserved," website (2016) 2 pages, https://www.wardsci.com/store/.

Molymod, "The original dual-scale system of molecular models," website, 1 page, http://www.molymod.com/sets.html.

* cited by examiner

DYNAMIC DEOXYRIBONUCLEIC ACID (DNA) MODELS AND KITS

CROSS-REFERENCE TO RELATED APPLICATIONS

This application is a non-provisional of and claims priority to U.S. Provisional Application No. 61/941,985, filed on Feb. 19, 2014, the entire contents of which are incorporated herein by reference.

STATEMENT REGARDING FEDERALLY SPONSORED RESEARCH OR DEVELOPMENT

This invention was made with government support under 1R43OD012216-01A1 awarded by the National Institutes of Health, Department of Health and Human Services. The government has certain rights in the invention.

BACKGROUND OF THE INVENTION

Physical models of molecular structures have long been recognized as valuable teaching tools. Physical models of the iconic DNA double helix are perhaps the most commonly encountered models in science classrooms from middle school through college. The models range in complexity from simplistic schematic models—that can be easily inter-converted between a flattened ladder structure and a right-handed double helix—to anatomically accurate models based on the atomic coordinates for B-form DNA.

SUMMARY OF THE INVENTION

Deoxyribonucleic acid or DNA is found in nearly all living cells. DNA is a complex molecule that consists of many components, a portion of which are passed from parent organisms to their offspring during the process of reproduction. Although each organism's DNA is unique, all DNA is composed of the same nitrogen-based molecules. It is the order in which these smaller molecules are arranged that differs among individuals. In turn, this pattern of arrangement ultimately determines each organism's unique characteristics, thanks to another set of molecules that "read" the pattern and stimulate the chemical and physical processes it calls for.

With reference to FIG. 1, at the most basic level, all DNA is composed of a series of smaller molecules called nucleotides (or sometimes called "bases"). Each nucleotide is itself made up of three primary components: a nitrogen-containing region known as a nitrogenous base (denoted with 'C' (but could also be A, T, or G) in FIG. 1), a carbon-based sugar molecule called deoxyribose (denoted with 'S' in FIG. 1), and a phosphorus-containing region known as a phosphate group (denoted with 'P' in FIG. 1) attached to the sugar molecule. As illustrated in FIG. 2, there are four different DNA nucleotides, each defined by a specific nitrogenous base: adenine (abbreviated "A"), thymine (abbreviated "T"), guanine (abbreviated "G"), and cytosine (abbreviated "C").

With reference to FIGS. 2-3, although nucleotides derive their names from the nitrogenous bases they contain, they owe much of their structure and bonding capabilities to their deoxyribose molecule. The central portion of this molecule contains five carbon atoms arranged in the shape of a ring, and each carbon in the ring is referred to by a number followed by the prime symbol ('). Of these carbons, the 5' carbon atom is particularly notable, because it is the site at which the phosphate group is attached to the nucleotide. Appropriately, the area surrounding this carbon atom is known as the 5' end of the nucleotide. Opposite the 5' carbon, on the other side of the deoxyribose ring, is the 3' carbon, which is not attached to a phosphate group. This portion of the nucleotide is typically referred to as the 3' end. When nucleotides join together in a series, they form a structure known as a polynucleotide. At each point of juncture within a polynucleotide, the 5' end of one nucleotide attaches to the 3' end of the adjacent nucleotide through a connection called a phosphodiester bond. It is this alternating sugar-phosphate arrangement that forms the "backbone" of a DNA molecule.

DNA is often found as a single-stranded polynucleotide however, it assumes its most stable form when double stranded. Double-stranded DNA consists of two polynucleotides that are arranged such that the nitrogenous bases within one polynucleotide are attached to the nitrogenous bases within another polynucleotide by way of special chemical bonds called hydrogen bonds. This base-to-base bonding is not random; rather, each A in one strand always pairs with a T in the other strand, and each C always pairs with a G. The double-stranded DNA that results from this pattern of bonding looks much like a ladder with sugar-phosphate side supports and base-pair rungs.

Because the two polynucleotides that make up double-stranded DNA are "upside down" relative to each other, their sugar-phosphate ends are anti-parallel, or arranged in opposite orientations. This means that one strand's sugar-phosphate chain runs in the 5' to 3' direction, whereas the other's run in the 3' to 5' direction. It is also critical to understand that the specific sequence of A, T, C, and G nucleotides within an organism's DNA is unique to that individual, and it is this sequence that controls not only the operations within a particular cell, but within the organism as a whole.

Learning about and teaching the concepts of molecular structures such as DNA can be difficult due to the complexities of the composition of DNA. Models that demonstrate the relative positions of each component and how the components are connected provide a 3D hands-on approach to learning and teaching about DNA. A 3D hands-on approach significantly supplements a 2D book only approach and allows students to explore the structure of DNA and to feel the simulated hydrogen bonding between the nucleotides and see the double helix emerge.

The present invention relates to a dynamic DNA model and DNA model kit that is based on the atomic coordinates of double-stranded DNA, but can be easily untwisted to form a flattened 2-D ladder structure. Once untwisted, the two strands of DNA can be easily "unzipped" to create single-stranded DNA templates that can be used to demonstrate the processes of DNA replication and transcription. This invention includes two joints that allow the DNA model to be dynamically transformed from its helical arrangement into a straight ladder-like arrangement, with parallel base pairs and anti-parallel "backbones." One is a simple pin joint, having rotation about one axis, and translation along that axis. The second joint can be a "compound" one having multiple degrees of freedom at different points; or, it can be simplified to a single rotation axis with a separate translation axis. One or both joints may be designed to limit the dynamic transition to the two desired "end positions."

This new model also allows for the modeling of nucleotide tri-phosphate units. The phosphate connector that joins with the sugar in a nucleotide does not rotate in that joint, but may rotate when that connector joins with another phosphate. In a final feature of the model, each nucleotide unit can be easily disassembled into three component parts—a nitrogenous base, a deoxyribose, and a phosphate group.

This new dynamic model of DNA allows educators to seamlessly teach both (i) the basic principles of DNA structure and (ii) the molecular processes of DNA replication and transcription—with a single model.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
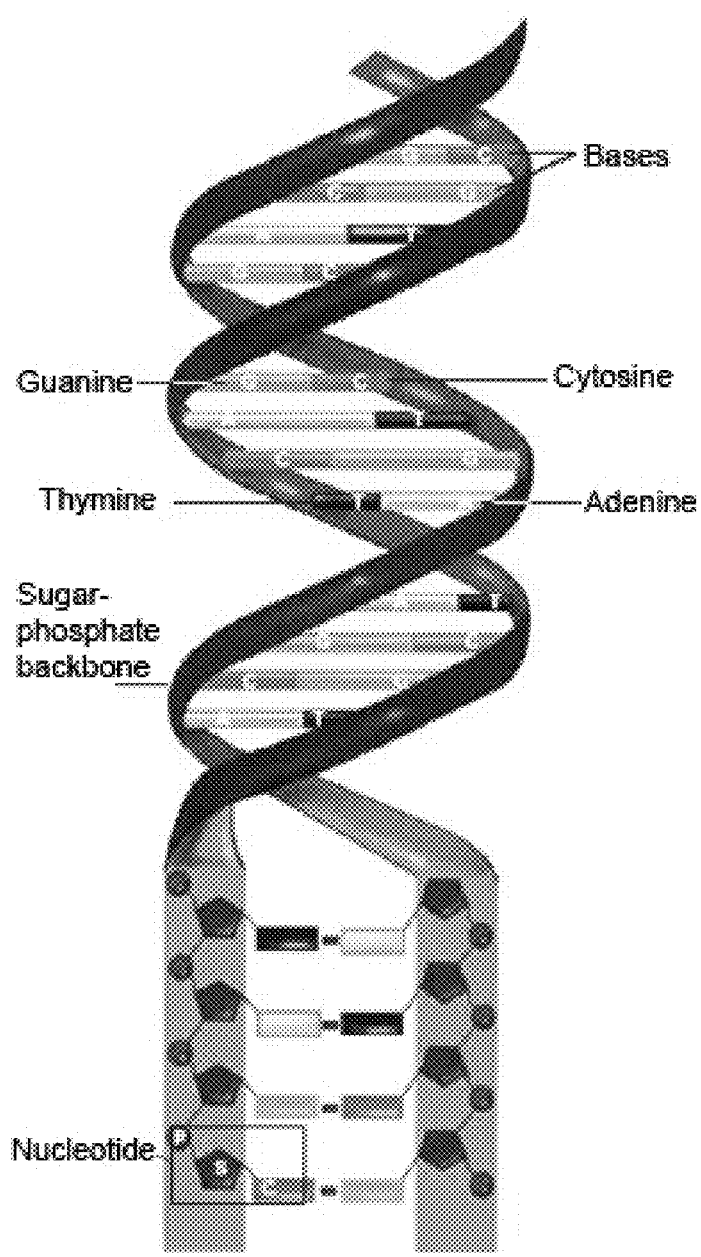
FIG. 1 is a schematic illustration of a DNA molecule.
Figure 2:
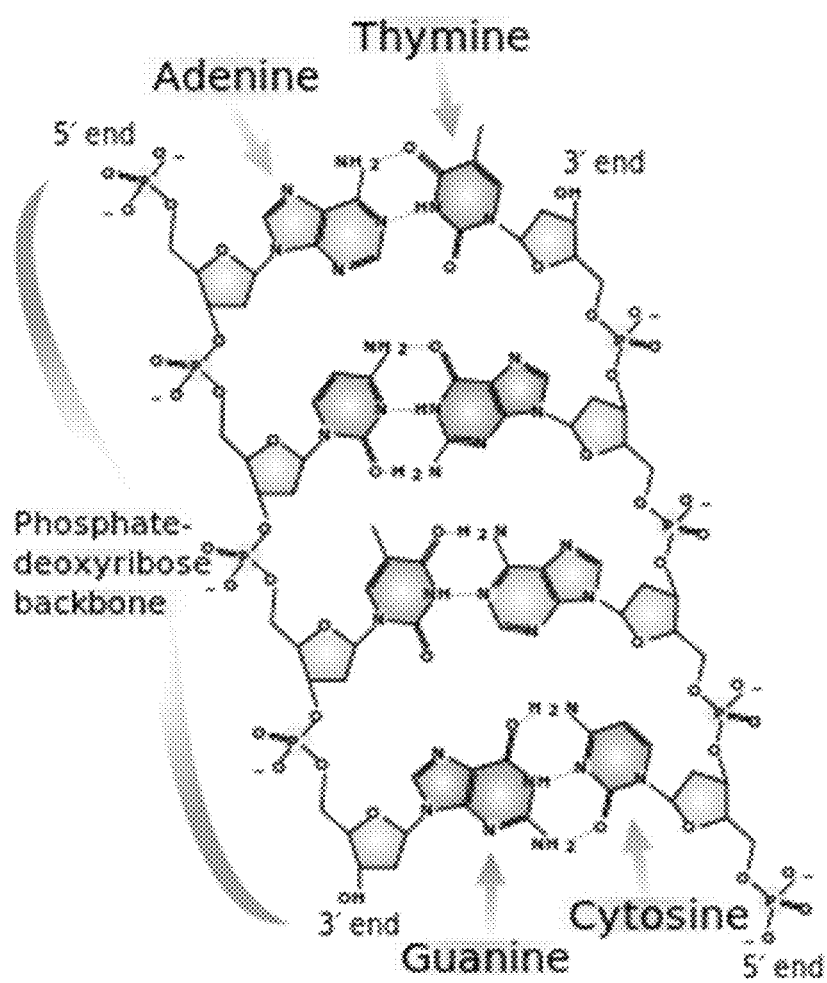
FIG. 2 illustrates the chemical structures of the nucleotides of a DNA molecule.
Figure 3:
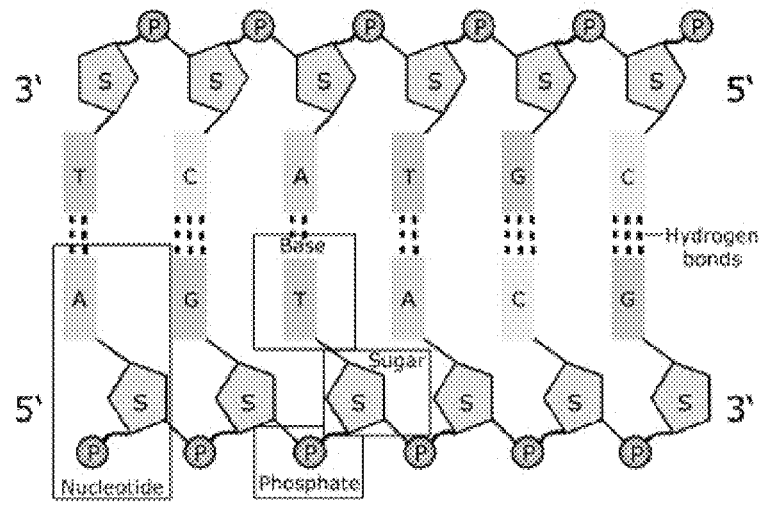
FIG. 3 schematically illustrates the pairing of the nucleotides of a DNA molecule.
Figure 5:
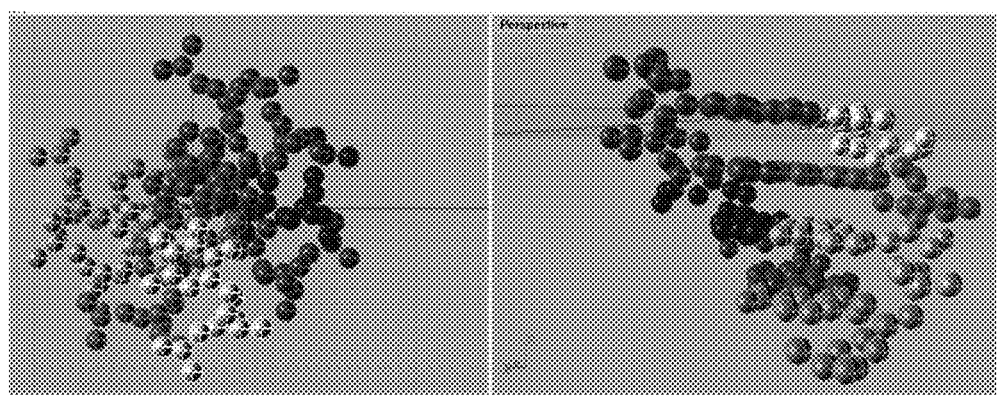
FIG. 5 is a rendering, using PDB-file data of several DNA base pairs in their double-helix form.
Figure 4:
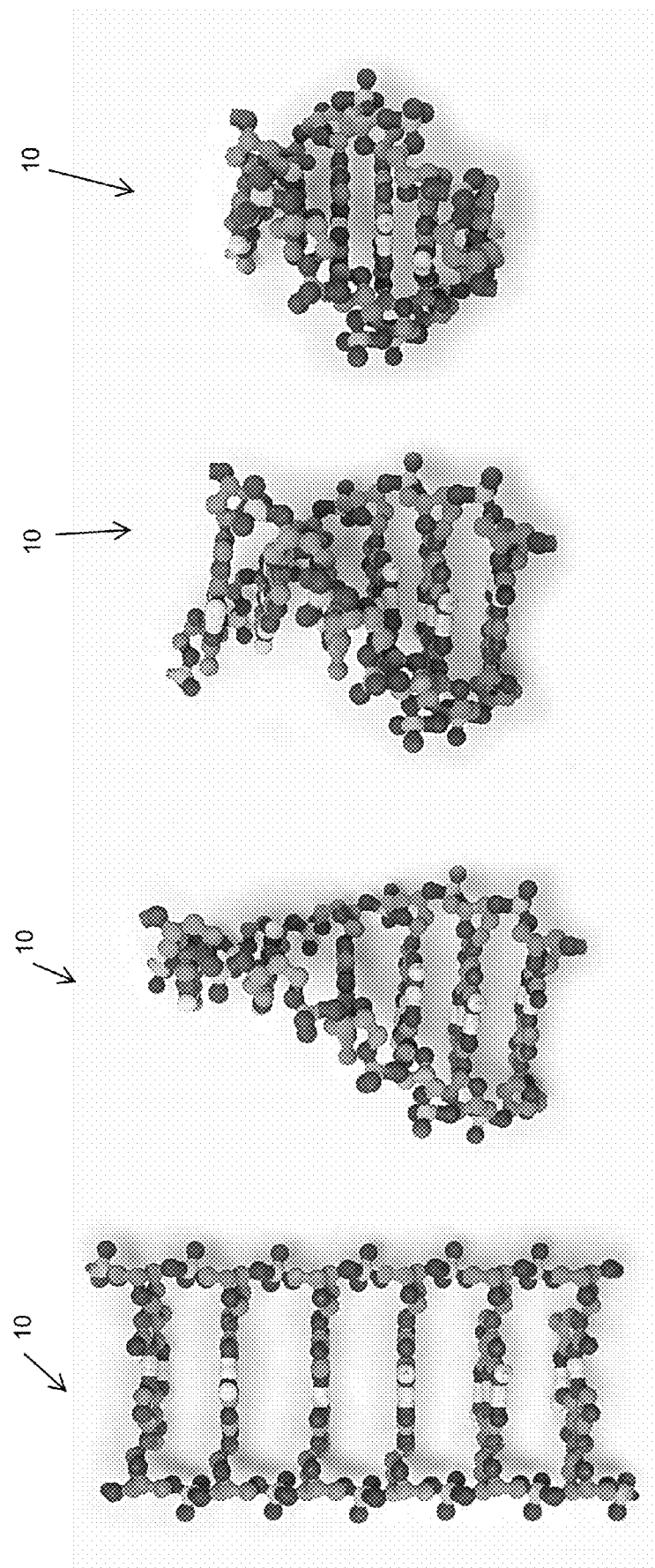
FIG. 4 illustrates a model of a DNA molecule transitioning from a ladder structure to a double helix structure and vice versa.

FIG. 4 illustrates a model 10 according to an embodiment of the present invention. In one construction, the model 10 includes a plurality of components for constructing a DNA model. The plurality of components that comprise the model 10 are included in a kit, which may include an instruction manual, a teaching manual, and a case for carrying and storing the model 10. FIG. 4 illustrates various steps of a model 10 of DNA transitioning from a ladder structure to an accurate double helix.

The models shown herein utilize data extracted from the "Daves_dna2.pdb" file from the protein databank (PDB file) (FIG. 4). It is noted that the invention described herein can apply to any suitable DNA model. As illustrated in FIG. 4, each nucleotide is represented as a separate color, e.g., A1 nucleotide is shown in red and T24 nucleotide is shown in white.

Figure 6:
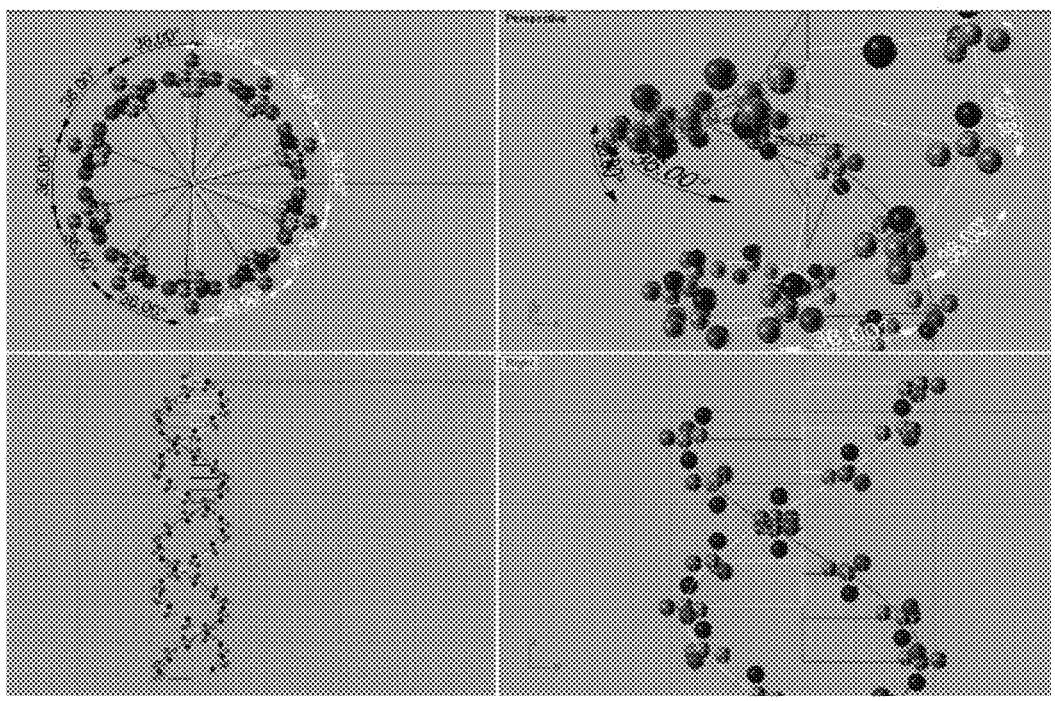
FIG. 6 illustrates how the angle between base pairs from the PDB file were measured. Only the phosphate groups are shown for clarity. The two separate measurement-annotation colors represent the measurements for each helix.

One of the rotation angles to be addressed by the dynamic model 10, for the transformation from double helix to ladder, is that between neighboring base pairs, measured relative to the collinear axes of the double helices. These atom coordinates have previously been set to provide a consistent helix form; and, the angle between subsequent base pairs, in this helical form, is exactly 36.0 degrees (FIG. 6), giving ten base pairs per full revolution of the double helix. Modifying this angle will alter the number of base pairs per helix revolution.

Figure 7:
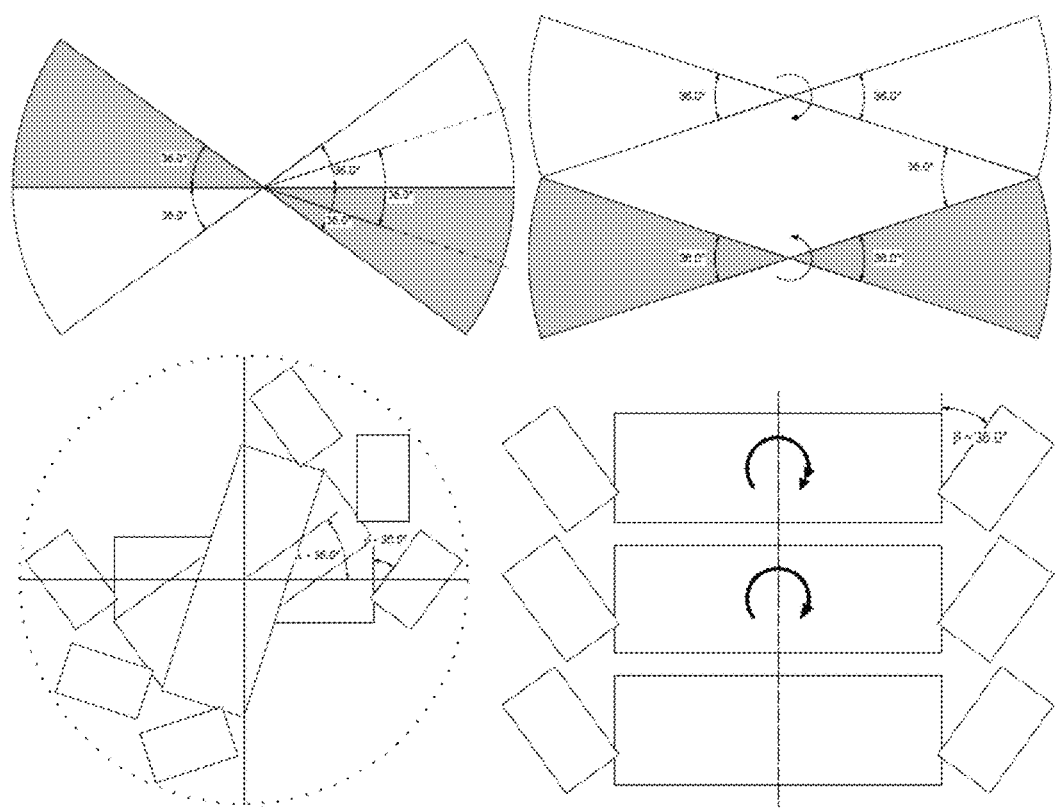
FIG. 7 illustrates conceptual graphics showing nucleotides that are 36.0 degrees apart in a helix (left images), and their rotations to align them parallel to each other (right images, shown side-by-side rather than stacked—out of the image—for clarity).

The sugar-to-phosphate inter-base-pair joint, set parallel to the collinear axes of the double helices, is a simple rotation to accommodate the necessary angle to dynamically alter the relative angle between neighboring base pairs, measured perpendicular to the helix axis. For this model, the joint only needs to provide 36.0 degrees of rotation for this motion, angle $\alpha$ in FIG. 7.

Figure 8:
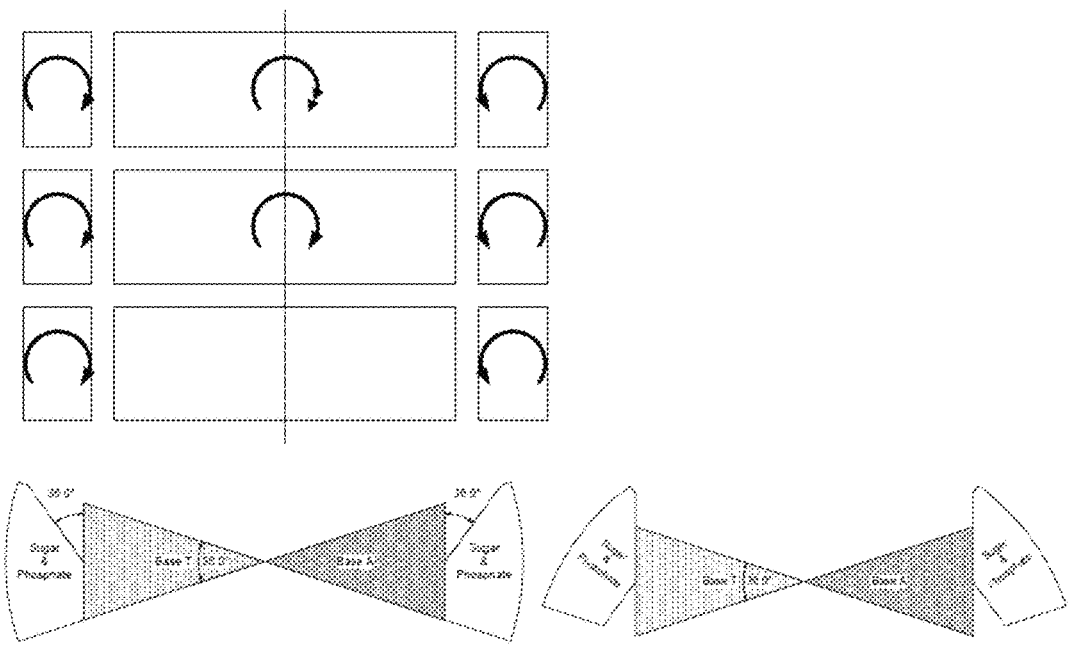
FIG. 8 illustrates conceptual graphics showing that the sugars and phosphates of each nucleotide could also be rotated relative to the nucleotide itself.

The angle between a sugar and base of a single nucleotide, measured perpendicular to the helix axis, could also be adjusted dynamically (FIG. 8) for better alignment of adjacent sugars and phosphates in the backbone of the DNA in the ladder form. For the model shown, the range of this motion was limited to 36.0 degrees.

Figure 9:
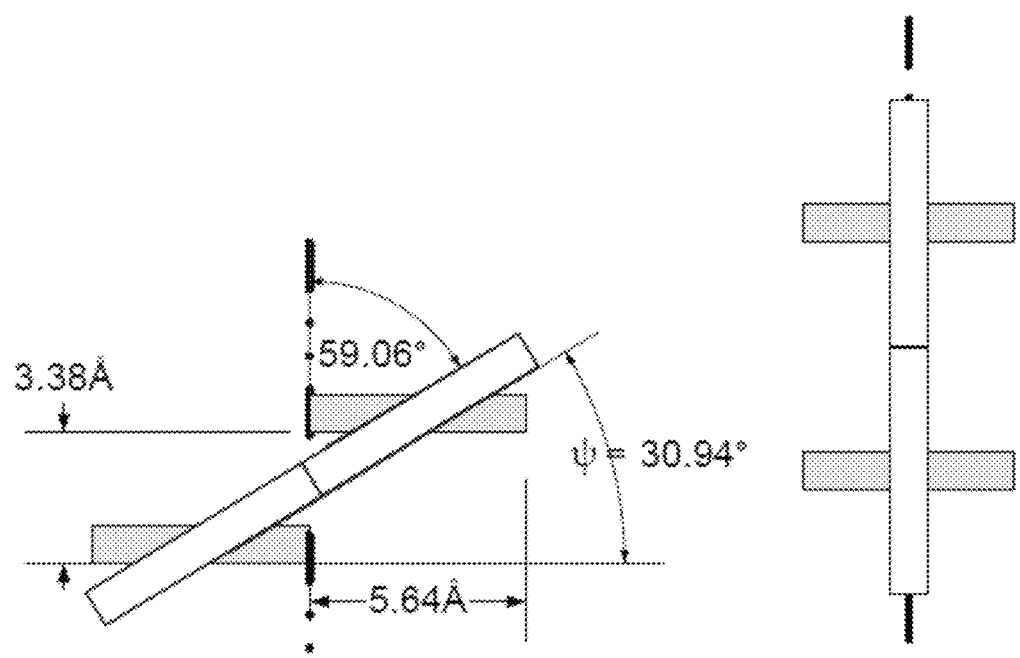
FIG. 9 illustrates a helix from the side, showing helix angle. Helix transformed into ladder form, side view.

The next angle to be accounted for is the rotation of the sugars and phosphates from the helix angle, calculated here as $\Phi=30.94°$ (Eq. 1), to be parallel with the helix axis, now in ladder form (FIG. 9). Again, this helix angle is specific to the PDB data used, but can be varied.

$$\frac{2\pi [\text{radian/turn}]}{10[\text{base pairs/turn}]} = \frac{\pi}{5} [\text{radian/base pair}] \qquad \text{Eq. 1}$$

$$S = \theta R = \left(\frac{\pi}{5}\right)(8.973\text{Å}) = 5.64\text{Å}$$

$$\tan\psi = \left(\frac{3.38\text{Å}}{5.64\text{Å}}\right) \Rightarrow \psi = 30.94° \Rightarrow 90° - \psi = 59.06°$$

Figure 10:
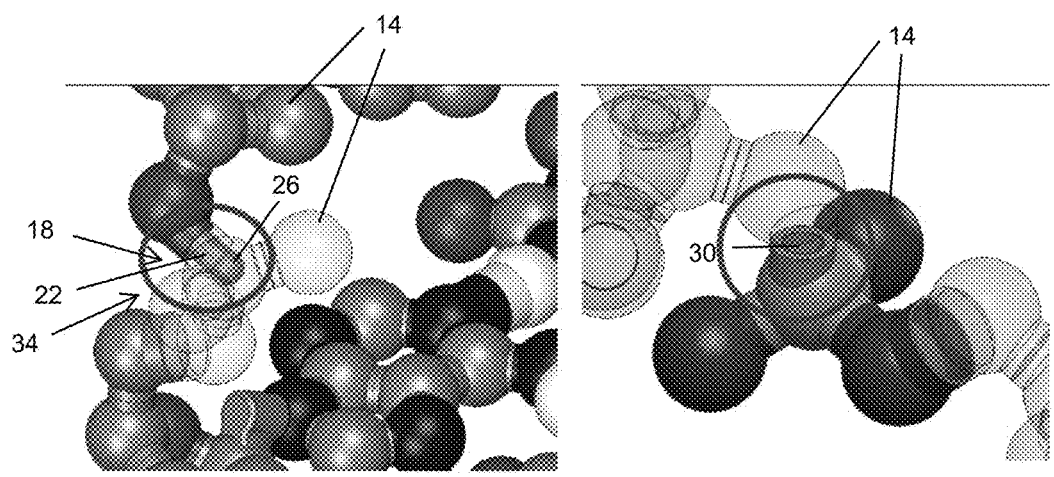
FIG. 10 illustrates an inter-nucleotide joint. Left image illustrates a pin with ball-end snap fit on O3* attached to the sugar. Right image illustrates a complementary socket in the phosphorous of the phosphate.

The model 10 includes a plurality of components or building blocks (e.g., spheroids) 14 as illustrated in FIGS. 4 and 10. The components 14 are removably connectable to one another and can be colored to designate a particular portion of the model 10. The components 14 can include a magnet positioned therewithin. Some of the components 14 include a first connector 18. The first connector 18 includes a post 22 extending from one of the components 14. The first connector 18 also includes a head 26 connected to a distal end of the post 22. As illustrated in FIG. 10, the head 26 is spherically shaped except where connected to the post 22. The head 26 of the first connector 18 is configured to be received in a recess 30 of another component 14. The recess 30 can be shaped complementary to the head 26 to provide a snap-fit or friction-fit type of interface or connection that holds the two components 14 together until force is applied to separate the two components 14. The components 14 can be interconnected with magnetic forces as well.

The first connector 18 and the recess 30 form a first joint 34. For purposes of further identifying the first joint 34 it may be described as an inter-nucleotide joint. The first joint 34 provides rotation about one axis (parallel to helix axis), and translation along that axis.

Figure 11:
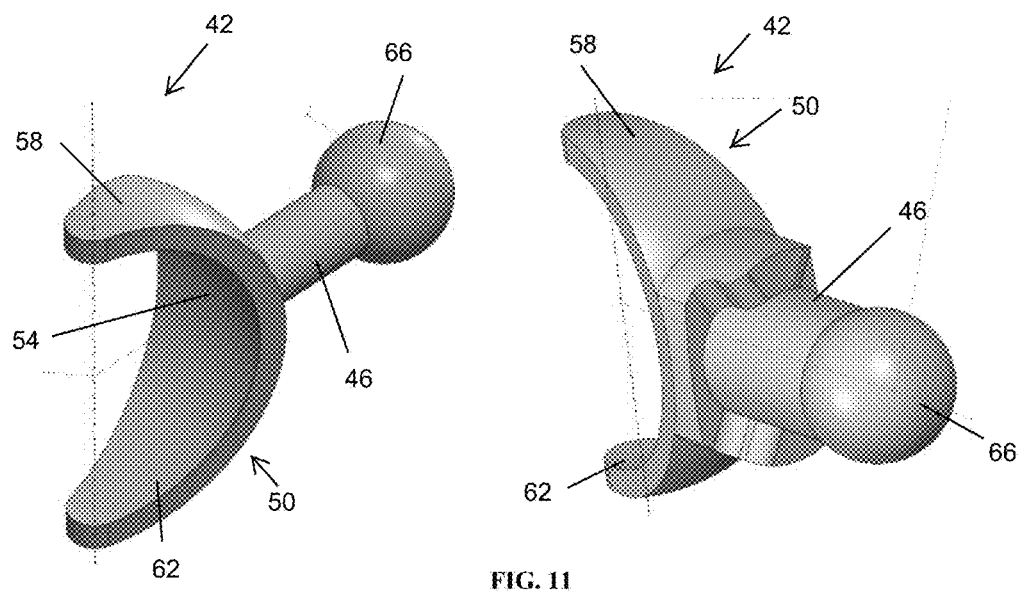
FIG. 11 illustrates a connector used to form an intra-nucleotide joint. The connector provides two orthogonal axes of rotation between the "base" and sugar. (Right image) Protrusion about the shaft limits the rotation about that axis.
Figure 12:
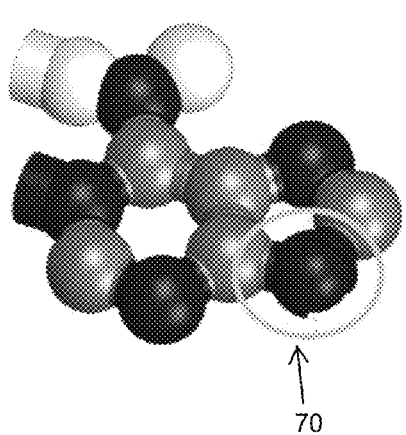
FIG. 12 illustrates (left image) that a recess in a nitrogen atom at base-sugar junction allows for limited rotation of orthogonal-axes connector. The right image illustrates an assembly showing orthogonal-axes connectors joining bases and sugars.
Figure 12:
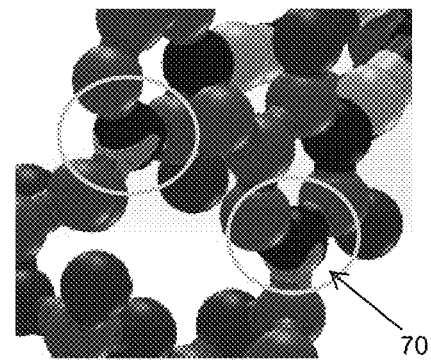

With reference to FIGS. 11-12, the model 10 includes a second connector 42 configured to connect with some of the components 14. The second connector 42 includes a post 46 extending from a socket 50. The socket 50 includes a base 54 connected to or integral with the post 46, a first arm 58 extending from the base 54, and a second arm 62 extending from the base 54. The area between the first arm 58, the base 54, and the second arm 62 is configured to receive one of the components 14. The component 14 can be held in the socket 50 with a snap-fit arrangement or a friction-fit type of arrangement. The second connector 42 also includes a head 66 connected to a distal end of the post 46. As illustrated in FIG. 11, the head 66 is spherically shaped except where connected to the post 46. The head 66 of the second connector 42 is configured to be received in a recess 30 of another component 14. The recess 30 can be shaped complementary to the head 66 to provide a snap-fit or friction-fit type of interface or connection that holds the two components 14 together until force is applied to separate the two components 14.

The second connector 42 forms a second joint 70. For purposes of further identifying the second joint 70 it may be described as an intra-nucleotide joint. The second joint 70 provides for multiple degrees of freedom at different points; or, it can be simplified to a single rotation axis with a separate translation axis.

Orthogonal-axes Joint: The two desired rotations can be achieved using a single connection piece between the base and sugar, for example. The yoke (or socket 50) of the connector 42 can be attached to the atom using a number of techniques, including protrusions with matching recesses in the atom or pins. The ball end (or head 66) can be replaced with any snap-type connection at the end or along the shaft (or post 46). Magnets are options for either as well.

Figure 13:
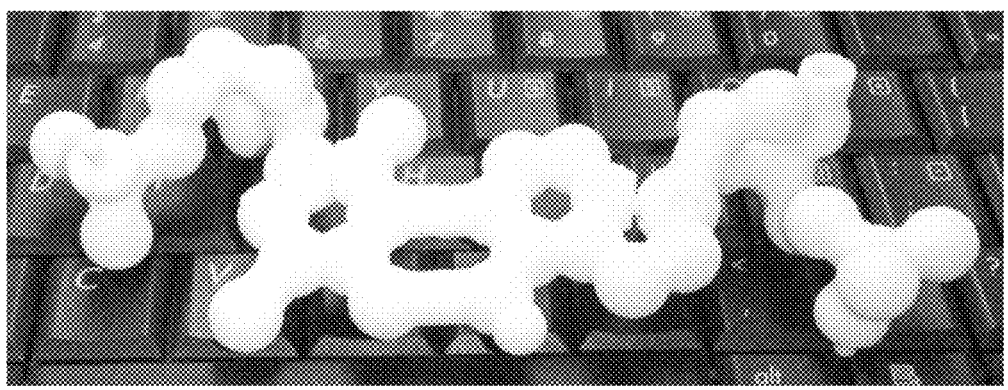
FIG. 13 is a photograph of a fabricated prototype for the "claw" connector.

Single-axis Joint: Multiple, sequential rotations can be simplified to a single rotation. This was first demonstrated using a "claw" intra-nucleotide connection between the base and sugar (FIG. 13).

Figure 14:
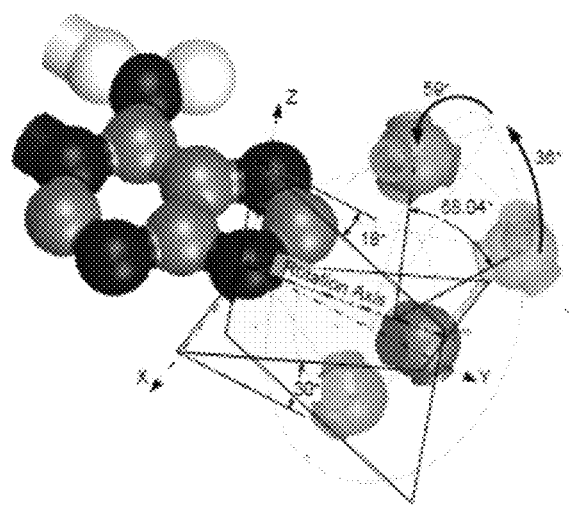
FIG. 14 is a CAD-based graphical determination of the orientation of the single-rotation axis and rotation degree that is equivalent to the two sequential rotations about orthogonal axes.

Axis determination—A more accurate determination of the single-axis orientation and required rotation angle was made (see FIG. 14).

This is summarized by:

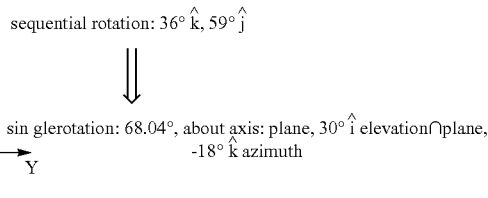

Eq. 2

Methods of axis calculation include graphical, via CAD, and direct quaternion calculation.

Figure 15:
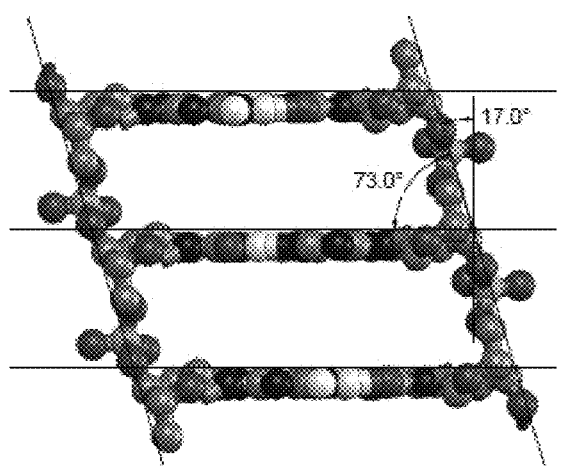
FIG. 15 is an image of DNA model assembly showing skew that results from using the two-angle-equivalent single axis.
Figure 16:
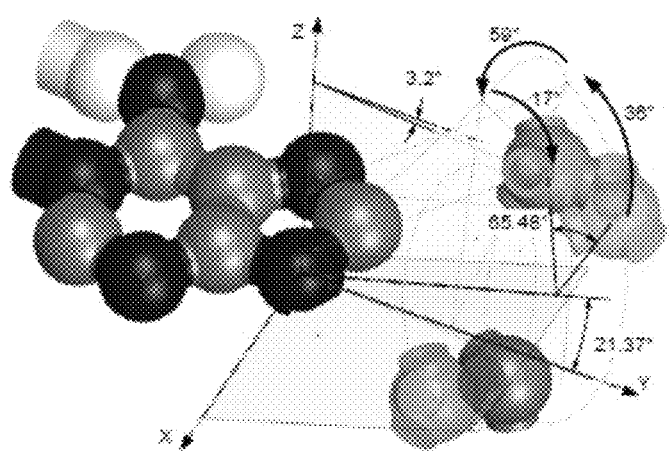
FIG. 16 is a CAD-based graphical determination of the orientation of the single-rotation axis and rotation degree that is equivalent to the three sequential rotations about orthogonal axes.
Figure 17:
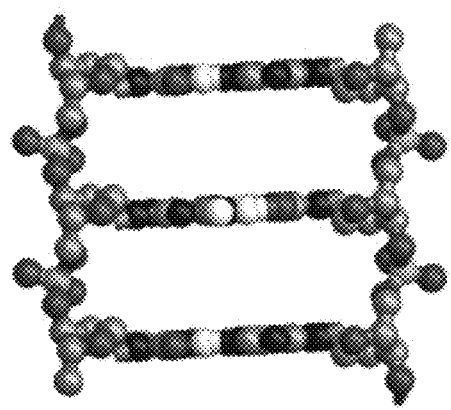
FIG. 17 illustrates an assembly of DNA nucleotides using three-angle-equivalent single rotation axis, showing minimal skew.

3 angles of rotation—using the two-angle-equivalent single-axis rotation, the resultant untwisted DNA structure showed a skew of about 17° (FIG. 15). It was decided to correct for this by including a third rotation in the sequence of −17°. The graphical determination of the new three-angle-equivalent single axis and rotation angle is shown in FIG. 16. FIG. 17 shows the resultant assembly with minimal skew.

This is summarized by:

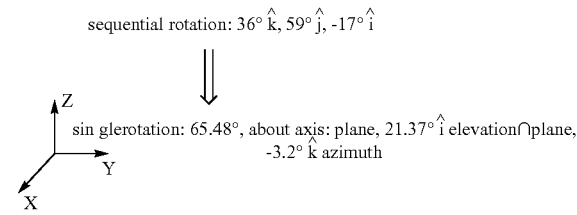

Eq. 3

Figure 18:
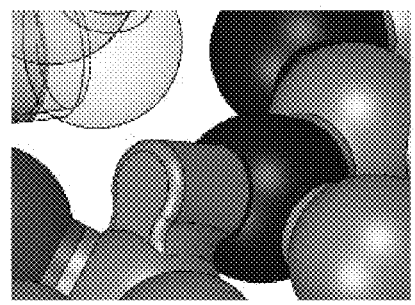
FIG. 18 illustrates a single-rotation-axis-aligned rotating-pin connector, protruding from the side of the WER carbon atom of the nucleotide sugar.

"Side-car" pin—the single-rotation axis for this model did not match the nitrogen-carbon bond direction between the base and sugar. A rotating-pin connector along this axis, fixed to the WER carbon of the sugar protrudes out from the side (FIG. 18).

Figure 19:
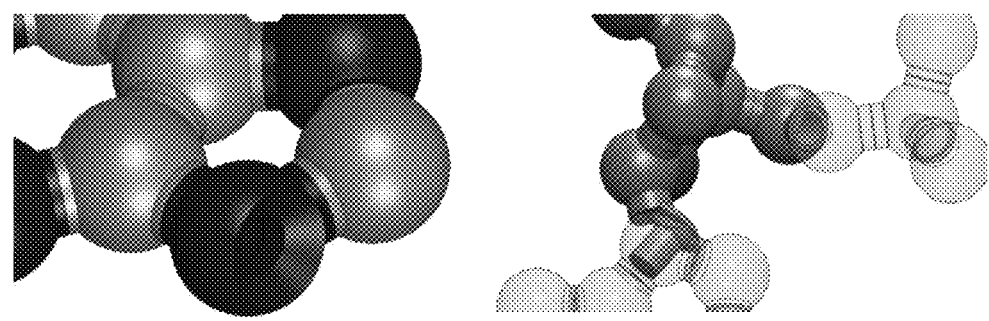
FIG. 19 illustrates a "simple peg" connector. The conical geometry cut out of the nitrogen atom is integrated into the connector for robustness and aesthetics.

"Simple peg"—the nitrogen at this joint could be divided, allowing for a portion of its geometry to rotate with the connector. Cutting with a plane normal to the single-rotation axis is an option, but hinders robustness. Cutting a cone out of this nitrogen atom about this axis (FIG. 19) provides a more robust connection. This cone, combined with a rotation pin, is then integrated with the carbon-nitrogen-bond geometry. Shown in FIG. 19, this connector is also integrated into the sugar geometry; but, it could be non-reversibly attached to the base instead, with an additional connection to the sugar, similar to the "twopiece" design (below).

Figure 20:
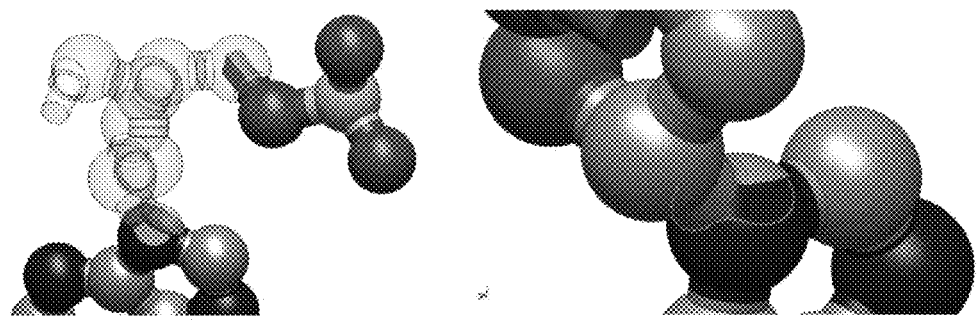
FIG. 20 illustrates another connector at the nitrogen-carbon-bond.

To provide the joint-rotation limits, the nitrogen-carbon-bond geometry is employed. The flat end of this geometry lands on two flat faces cut into the nitrogen atom, set at the desired rotations, normal to the nitrogen-carbon-bond direction (FIG. 20).

Figure 21:
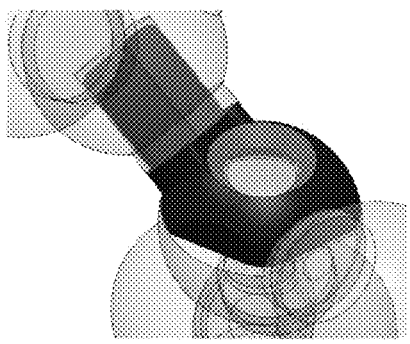
FIG. 21 illustrates a "two-piece" connector between neighboring sugars and phosphates.
Figure 21:
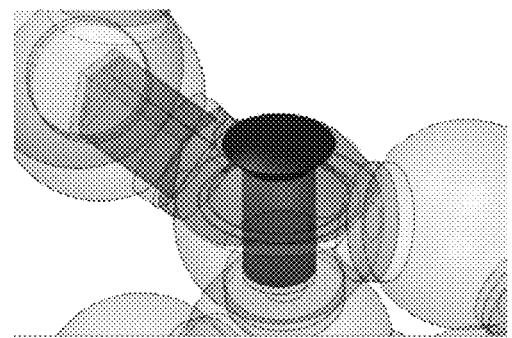
Figure 22:
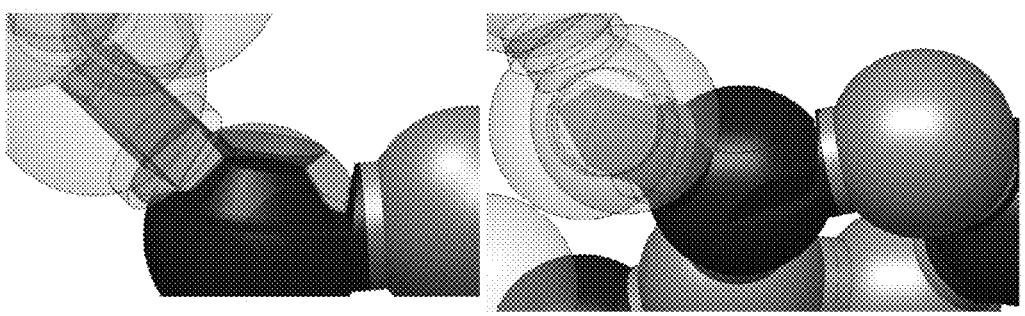
FIG. 22 illustrates a "two-piece" connector between neighboring sugars and phosphates.

Two-Piece Connector—see FIGS. 21 and 22

This is a modified connection between neighboring sugars and phosphates—connection axis forced parallel to DNA-helix axis, rather than center-to-center between backbone oxygen and phosphorous atoms.

Due to the symmetry of the data in the PDB file used for these models, the geometry for the sugar and phosphate of a single nucleotide can be connected to any nucleotide within that DNA model.

Although the invention has been described in detail with reference to certain preferred embodiments, variations and modifications exist within the scope and spirit of one or more independent aspects of the invention as described.

What is claimed is:

1. A molecular modeling kit comprising:
   a plurality of spheroids, each spheroid providing a physical representation of at least one atom;
   a first connector including a first post extending from a first one of the spheroids and a first head connected to a distal end of the first post, the first head configured to be received within a first recess of a second one of the spheroids, wherein the first connector and the first recess form a first joint that provides rotation about an axis; and
   a second connector including a second post extending from a socket configured to receive one of the spheroids and a second head connected to a distal end of the second post, the second head configured to be received within a second recess of one of the spheroids, wherein the second connector and the second recess form a second joint.

2. The molecular modeling kit according to claim 1, wherein the first joint is positioned between a first nucleotide and a second nucleotide.

3. The molecular modeling kit according to claim 1, wherein the second joint is positioned between atoms of a nucleotide.

4. The molecular modeling kit according to claim 1, wherein the first joint provides for translation along a path offset from the axis when the molecular model is twisted.

5. The molecular modeling kit according to claim 1, wherein the first head includes a magnet and wherein the first recess includes a magnet, and wherein the first head and the first recess are magnetically coupleable.

6. The molecular modeling kit according to claim 1, wherein the second joint provides for at least two orthogonal axes of rotation when the molecular model is twisted.

* * * * *